F. RAUSCHER.
AUTOMOBILE SIGNAL.
APPLICATION FILED MAY 27, 1916.
1,257,117.
Patented Feb. 19, 1918.
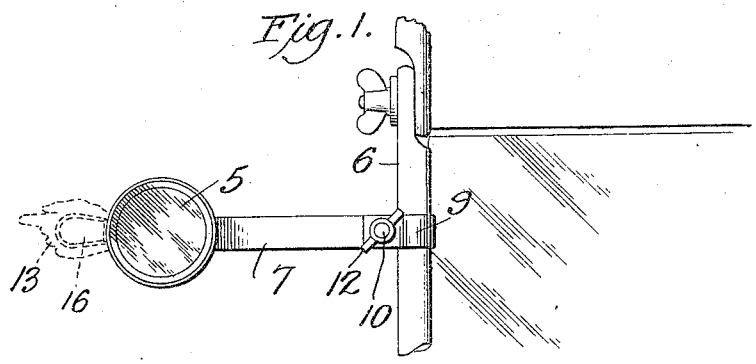
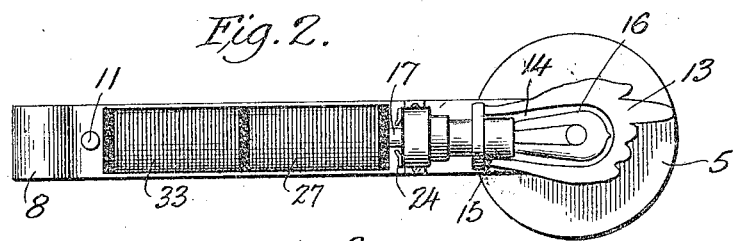
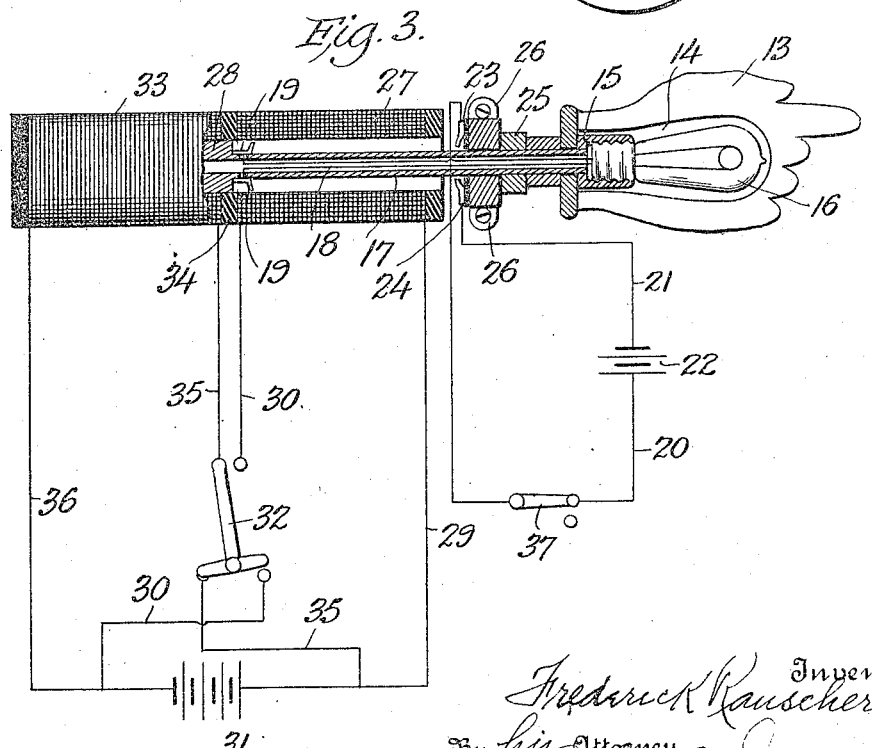
Inventor
Frederick Rauscher
By his Attorney

UNITED STATES PATENT OFFICE.

FREDERICK RAUSCHER, OF PORT RICHMOND, NEW YORK.

AUTOMOBILE-SIGNAL.

1,257,117.  Specification of Letters Patent.  Patented Feb. 19, 1918.

Application filed May 27, 1916. Serial No. 100,387.

*To all whom it may concern:*

Be it known that I, FREDERICK RAUSCHER, a citizen of the United States, residing at Port Richmond, county of Richmond, and State of New York, have invented certain new and useful Improvements in Automobile-Signals, of which the following is a specification.

This invention has relation to automobile signaling devices and the general object thereof is to provide a signaling device adapted to be connected to a suitable portion of a vehicle and operable to indicate when a change in the direction of progressive movement had by such vehicle is about to be made; and further adapted to permit the driver, when about to effect a change in the direction of movement of his car, to determine whether there is occasion for signaling such change to the region behind the car. And to these ends the invention resides in combining a signaling device with a rear view mirror, and so constructing and arranging the parts that when the signal is not in use its presence on the vehicle to a view from the rear thereof will be concealed by the mirror.

Other objects will appear and be better understood from that embodiment of my invention of which the following is a specification, reference being had to the accompanying drawings forming part hereof, and in which:

Figure 1, is an elevation showing the device in use and as it appears when viewed from the rear of a motor vehicle.

Fig. 2, is a detail elevation of the invention as it appears when viewed from the forward end of a motor vehicle.

Fig. 3, is a diagrammatic view of the complete invention showing the parts thereof in elevation and in section.

5 indicates a conventional rear view mirror which is supported so as to extend laterally from the wind shield frame 6, or other suitable portion of the vehicle by a bracket arm 7, whose outer end is secured to the mirror 5, and the inner end portion of which is adapted to be adjustably and detachably connected to the wind shield frame 6, in any suitable manner as, by forming the said inner end portion with a curve 8, to coöperate with the curved end 9, of a strap which is disposed on the bracket arm 7 as shown. A screw 10, which passes through alining openings 11 in the strap and bracket arm, and a nut 12, coöperate to cause the curved portions 8 and 9 to frictionally bind on the side 6, of the wind shield frame.

The outer end portion of the signaling device about to be described may be of any suitable construction. In the present instance it is shown in the form of a fist 13, the area of which is so proportioned to the area of mirror 5, as to be concealed by the said mirror when moved into alinement therewith. The fist is formed with a recess 14, in one end of which is arranged a socket 15, for the incandescent lamp 16. When the signal is in use the fist 13, projects beyond the mirror 5, as shown by dotted lines in Fig. 1. In this position of adjustment the fist can readily be seen in day time from a position in front or to the rear of the vehicle, and the provision of the incandescent lamp 16, when the same is illuminated, adapts the fist to be visible at night from either of the aforesaid positions. The supporting arm 17 for the fist is connected thereto in any suitable manner and is disposed on the forward side of bracket arm 7, as viewed in Fig. 1. If found desirable the supporting arm 17, may be adapted to control the illumination of lamp 16. A convenient structure which will produce this result is shown in Fig. 3, where the supporting arm 17 is hollow and interiorly provided with conducting wires 18, connected at one end of the socket 15, and further connected at their opposite ends to plates 19—19, secured to and insulated from the arm 17. The wires 20 and 21 of an electric circuit, in which there is a source of electric energy, are connected to terminals 23 and 24. When the fist, 13, is in alinement with mirror 5, as shown in Fig. 2, the plates 19, will be spaced from the terminals 23. But when the fist is adjusted to the position shown in Fig. 1, the plates 19, contact with terminals 23 and thereby close the circuit through lamp 16. A guide 25 is provided for supporting arm 17, and is formed with a relatively generous bearing surface so as to prevent rocking of the said arm. The guide is arranged on the front side of bracket arm 7, as viewed in Fig. 1, and is provided with perforated lugs 26, which receive screws, or their equivalents, for fastening the guide to the bracket arm.

Any suitable means may be provided for projecting the fist to a position beyond the mirror 5, and for retracting the fist into the position shown in Fig. 2. In the present instance I have shown an electrically operated device for projecting the said fist. This device includes a solenoid coil 27, arranged on the same side of the bracket arm as the supporting arm 17, and suitably secured against displacement. The core 28 of the solenoid is suitably connected to the inner end of supporting arm 17. The solenoid coil is connected in circuit by conducting wires 29 and 30 with a source of electric energy herein shown as a battery of cells 31. The circuit is controlled by a push button switch or its equivalent 32 arranged on the steering wheel or on any other portion of the vehicle easily accessible to the driver. When the circuit is closed by switch 32 the solenoid coil 27 is energized and operates the core 28 to move outwardly until the plates 19, abut the terminals 23 and 24. During the outward movement of the core a spring, or its equivalent (not shown) may be energized so as to restore the core to its original position and thereby operate to retract the fist when the solenoid coil is deënergized, by opening the circuits thereof. Or as shown in Figs. 2 and 3, there may be a second coil 33 arranged in alinement with coil 27 and insulated therefrom as indicated by 34. With this construction the free end portion of core 28 will be near the adjacent ends of coils 27 and 33 when the fist is in the extended position as shown in Fig. 1, so that when the circuit of coil 33, the wires of which are indicated by 35 and 36, is closed, and the circuit of coil 27 opened, coil 33 will operate the core 28 to retract the fist 13, to the position shown in Figs. 2 and 3. Switch 32 may be adapted to function as a controller for the circuit of coil 33 as shown or a separate form of circuit closer may be provided.

I have shown a switch 37 for controlling the circuit of incandescent lamp 16. In daylight this switch is adjusted into the open position so as to avoid the wasting of current when the fist is in the projected position. At night however the switch 37 is arranged into closed position so that when the plates 19—19 contact with the terminals 23 and 24 the lamp will be illuminated for the purpose hereinbefore mentioned. It will be noted that although shown a source of electric energy for illuminating the lamp 16, separate and distinct from that which operates the solenoids 27 and 33, this arrangement is by no means necessary, it being obvious that the circuit for lamp 16 may be supplied from the source 31. The switch or circuit closer 37 is by preference located on the steering wheel or otherwise arranged so as to be within easy reach of the driver and by preference this switch 37 is of the type that will permit of its being readily opened and closed, whereby the lamp 16 may be caused to give a series of flashes in close succession and thereby operate more readily at night to attract the attention of the driver of a following vehicle when the fist is in the projected position.

It will be noted that the device of this invention presents a neat and attractive appearance and by reason of being combined with an extensively used attachment, to wit a rear view mirror, does not require the provision of alterations to the car or extra room or fittings beyond what are required for an ordinary rear view mirror.

What is claimed as new is:—

1. A signal comprising alined magnets, means for supplying electric current to one or the other of the magnets, a core movably mounted in the magnets, a tube carried by the core, terminals carried by the tube and normally housed in one of the magnets, a bulb carried by the tube and electrically connected with the terminals, a bracket guiding the tube, terminals mounted on the bracket and located between the bracket and the end of one of the magnets and in the paths of movement of the terminals upon the tube, and an electric circuit connected with the terminals on the bracket.

2. In a vehicle, a laterally projecting stationary bracket arm, a rear view mirror disposed at the outer end of the said arm, magnets mounted on the arm, a core movably mounted in the magnets, means for supplying electric currents, to one or the other of the magnets a guide bracket mounted on the stationary bracket, an element slidably associated with the guide and having connection with the core for operation by the latter, and a second element carried by the first element and normally concealed by the mirror, and adapted to be projected outwardly beyond the mirror when the first mentioned element is moved in one direction for the purpose specified.

In testimony whereof, I have signed my name to this specification.

FREDERICK RAUSCHER.